US012594796B2

(12) United States Patent
Shah et al.

(10) Patent No.: US 12,594,796 B2
(45) Date of Patent: Apr. 7, 2026

(54) SYSTEM TO DYNAMICALLY CHANGE END OF ARM TOOLING FOR TIRE ASSEMBLY

(71) Applicant: INTERNATIONAL WHEEL & TIRE COMPANY, Farmington Hills, MI (US)

(72) Inventors: Harsh Suresh Shah, Royal Oak, MI (US); Raymond Richard Risley, III, Belleville, MI (US); Todd Allen Campbell, LaSalle, MI (US)

(73) Assignee: INTERNATIONAL WHEEL & TIRE COMPANY, Farmington Hills, MI (US)

( * ) Notice: Subject to any disclaimer, the term of this patent is extended or adjusted under 35 U.S.C. 154(b) by 796 days.

(21) Appl. No.: 17/890,894

(22) Filed: Aug. 18, 2022

(65) Prior Publication Data

US 2023/0057819 A1 Feb. 23, 2023

Related U.S. Application Data

(60) Provisional application No. 63/235,475, filed on Aug. 20, 2021.

(51) Int. Cl.
*B60C 25/05* (2006.01)
*G01M 1/32* (2006.01)

(52) U.S. Cl.
CPC ...... *B60C 25/0515* (2013.01); *B60C 25/0509* (2013.01); *B60C 25/0512* (2013.01); *B60C 25/0587* (2013.01); *G01M 1/326* (2013.01)

(58) Field of Classification Search
CPC ........... B60C 25/0515; B60C 25/0509; B60C 25/0512; B60C 25/0587; G01M 1/326
See application file for complete search history.

(56) References Cited

U.S. PATENT DOCUMENTS

| | | | |
|---|---|---|---|
| 2012/0073764 A1* | 3/2012 | Lawson | G01M 1/326 157/1.1 |
| 2021/0347058 A1* | 11/2021 | Chalofsky | B60C 25/0512 |

* cited by examiner

*Primary Examiner* — John E Breene
*Assistant Examiner* — Manuel Salvador Castellon, Jr.
(74) *Attorney, Agent, or Firm* — BROOKS KUSHMAN, P.C.

(57) ABSTRACT

A weight apply system capable of changing tooling to apply weights to an assembly to correct unbalance. It may include a selectively movable arm, at least one weight apply tool, the ability to change the tooling based on assembly type, and a controller configured to manage the selection of the tool, loading the weight, and application of the weight to the assembly in station.

12 Claims, 4 Drawing Sheets

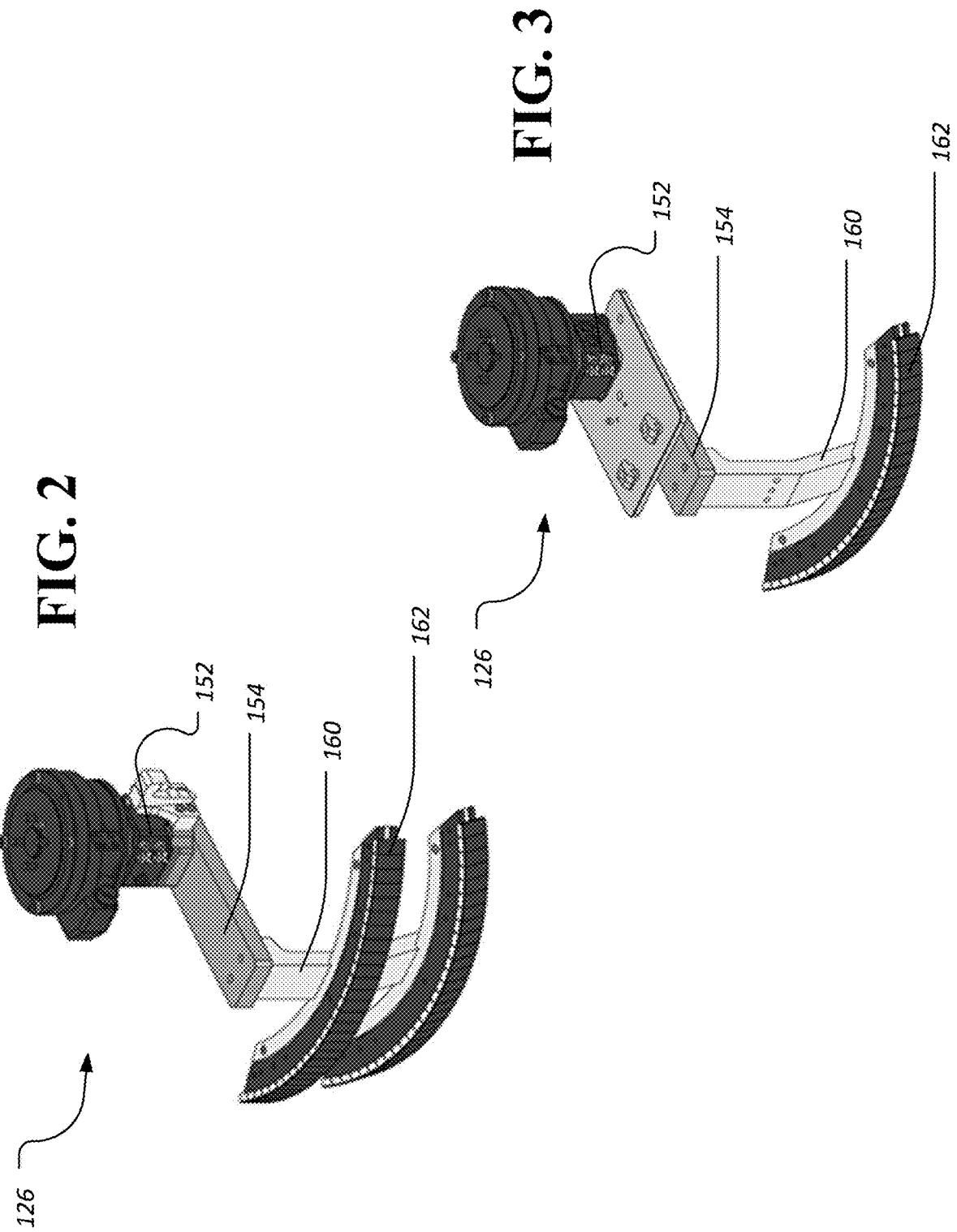

SYSTEM TO DYNAMICALLY CHANGE END OF ARM TOOLING FOR TIRE ASSEMBLY

CROSS-REFERENCE TO RELATED APPLICATIONS

This application claims the benefit of U.S. provisional application Ser. No. 63/235,475 filed Aug. 20, 2021, the disclosure of which is hereby incorporated in its entirety by reference herein.

TECHNICAL FIELD

Disclosed herein are end of arm tooling systems for tire assembly systems.

BACKGROUND

Wheel and tire assemblies are used in many different applications, including, for example, automotive applications. Any weight imbalance in rotating elements may result in undesirable vibration. In the automotive industry, for example, such vibration can undesirably impact wear on vehicle components or create a poor vehicle driving experience for riders in a vehicle. Various types of weight material have been used to address balance issues. For example, it is known to apply weights to a wheel rim.

SUMMARY

A robotic weight apply system of a tire & wheel assembly system configured to apply weights to a tire assembly, may include a selectively movable arm, and at least one weight apply tool connected to a movable arm that is selected from a plurality of weight apply tools based on the tire assembly A method for a system to select a tool for weight apply may include receiving tire assembly data identifying the tire assembly, determining a tool needed to apply weight to the tire assembly, instructing a mechanical system to couple to the determined tool arranged within a cell of the mechanical system, and controlling the system to apply the weights to the assembly.

A mechanical system designed to apply weight to an assembly may include a controller configured to provide instructions to a weight apply mechanical system, including: receiving assembly data indicating at least one tire assembly type, determining an end-of-arm tool specific to the tire assembly type, instructing a mechanical system to couple to the determined end-of-arm tool, and instructing mechanical system to apply weights via the end-of-arm tool to the assembly.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 2 illustrates a perspective view of an example robotic weight apply tool;

FIG. 3 illustrates a perspective view of another example robotic weight apply tool;

DETAILED DESCRIPTION

Figure 1:
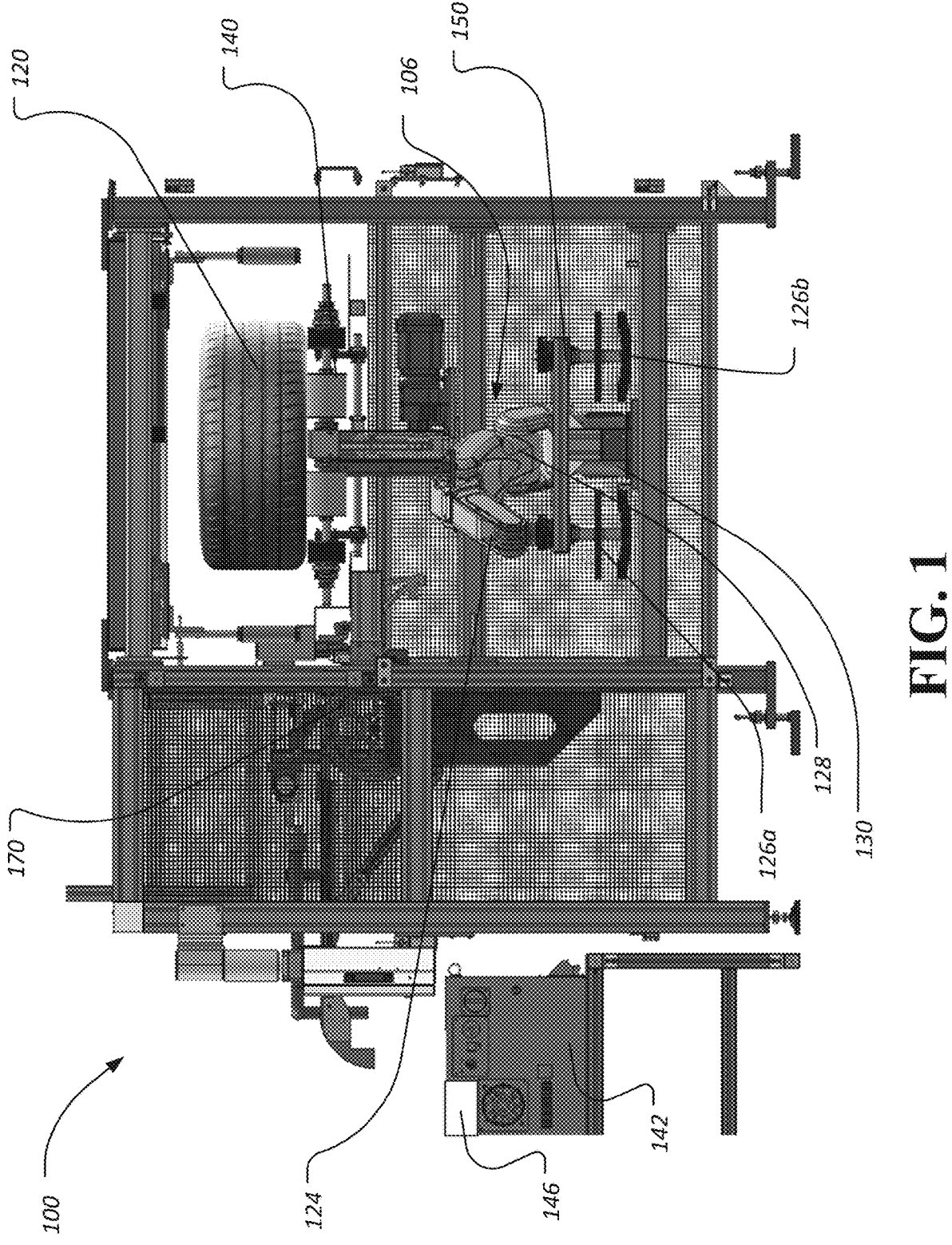
FIG. 1 illustrates a side view of a robotic weight apply system for a dynamic tool selection system for a vehicle tire and assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Original Equipment Manufacturers (OEMs) assemble every vehicle with multiple tire and wheel assemblies. These assemblies are comprised of one tire and one wheel. After assembling the tire onto the wheel, it is inflated and then balanced. Balancing is accomplished with a high precision machine to measure the unbalance and identify the weight and location of where the weights need to be applied on the wheel to correct the unbalance. These correction weights can be applied by hand or can be applied automatically with a robot or a bespoke design. In addition to this, cleaning, wiping, greasing, may also be performed on the tire assembly.

There is a trend and a desire to consolidate the manufacturing of the tire and wheel assemblies and take advantage of volumes to reduce manufacturing cost. The challenge is that variations in the assemblies requires multiple designs for the end-of-arm tooling that is used to automate the application of the weights. Thus, an automated tool changer that will allow the same equipment to service a wide variety of assemblies and applications without having to perform a manual changeover is beneficial, lowers costs, increases productivity, and flexibility of a single weight apply cell.

Disclosed herein is an automated tool changer for a robotic system that is used to exchange tooling based on what is needed to perform various applications on the tire and wheel assembly, such as apply the correction weight(s) to a tire and wheel assembly. This solution applies to a robotic solution or bespoke design. The machine will receive the information by reading or by being sent the information about the tire assembly as it becomes available. The information may indicate the tire assembly information and the correction information, which may be used to apply the correction weight to the assembly.

The process includes the determination of the correct tooling based on assembly type, the process to ensure the correct tooling is attached, and the automatic or semi-automatic application of the specified weight. The equipment receives the assembly and correction weight information. The system uses that information to determine the correct tooling needed for weight application. Once the correct tooling is determined, the unit will then attach the correct tooling if the currently attached tooling is not correct. It will then load that tooling with the correction weight(s) and then will apply the weight(s) to the specified location(s) to ensure proper application and wet-out.

FIG. 1 illustrates a side view of a robotic weight apply system 100 for a vehicle tire assembly. In the examples discussed herein, the system 100 generally is discussed with respect to a tire assembly system, but other applications may be realized. The weight apply system 100 may be referred to as a weight apply cell 100 and may be an area of an assembly configured to apply weights to tires. The cell 100 may be encapsuled, or partially encapsuled in a frame and cage and may include a robotic weight apply 106, also referred to as robot 106, herein, within the cell 100. The weight apply 106 may be a robotic device configured to apply weights to the tire, among other functions. A tire assembly or tire 120 is illustrated in FIG. 1. While references are made to a robot 106, the system described herein may be used for non-robotic systems as well. Reference to robot, but add option for non-robot.

The weight apply robot 106, or weight apply 106, may include at least one articulated joint and a wrist, and an arm 124. The arm 124 may be positioned between the joint and the wrist and may allow for the weight apply 106 to be capable of selective movement with at least three degrees of freedom along one of a selectable plurality of programmable predetermined paths. The joint may be mounted to a body portion 128 that is connected to a base portion 130. In one exemplary arrangement, the body portion 128 is rotatably-connected to the base portion 130 such that the body portion 128 may be pivoted relative to the base portion 130. Further, the body portion 128 may be hinged to the base portion 130 such that the body portion 128 may be articulated vertically relative to the base portion 130.

A tool 126 may be mounted to the wrist of the weight apply 106. The arm 124 may be connected to the body portion 128 such that the arm 124 may be articulated in any desirable upward or downward position relative the body portion 128. Similar to the rotatable connection of the base portion 130 and body portion 128, the tool 126 may be rotatably-connected to the arm 124 such that the tool 126 may be rotated, pivoted or otherwise spun 360° relative the arm 124. Thus, the tool 126 may be maneuvered within the tire 120 to apply weights thereon.

The tool 126 and robot 106 may include force sensor capable of measuring the force at which the weight is being applied. These sensors may supply important feedback to the system to determine whether the method and process was successfully completed. This may be used to determine whether the process complied with manufacturer requirements. The force sensor may include tensile force, compression force, or tensile and compression force sensors. The applied mechanical force of the tool 126 may be measured and translated into an output signal.

The tool 126 may be any type of tool used for tire and wheel assembly. In the example shown, the tool is a weight apply tool configured to apply weights to the inside of the tire 120. These balance weights may be applied and adhered to certain locations of the tire 120 to balance the tire 120 during assembly. Each tire 120, once inflated, may be measured and an appropriate balance determined, including a number, weight, and location of the weights to be applied in order to correct the unbalance. Further, it is desirable for a single cell 100 to be able to apply weights to numerous assembly types and sizes. However, each assembly may require a specific end-of-arm tooling in order to appreciate automated processes via the weight apply 106. Often times a manual changeover is required to change the end of arm tooling before a new tire type can be balance within the cell 100.

In order to further automate and make more efficient the weight apply process, the system 100 includes interchangeable tooling that may be customized and selected for specific tire types. The system 100 may include a nest 150 arranged adjacent or near the base portion 130. The nest 150 may be a frame, shelf, compartment, or receptacle configured to hold and maintain at least one tool 126. In the example shown in FIG. 1, the nest 150 maintains two tools 126, including a first tool 126a and a second tool 126b. These tools 126 may be weight apply tools, in one example. The nest 150 may maintain the tool 126 while not in use, but may also be configured to allow the tool 126 to be removed therefrom for use by and coupling with the arm 124.

Example tools 126 are illustrated in FIG. 2 and FIG. 3. Each tool 126 of the plurality of tools 126 stored within the nest 150 may have a distinct tool configuration, each configuration specific to the tool assembly type. The tool 126 may include a coupling 152 configured to attach to the wrist or arm of the weight apply 106. The coupling 152 may be attached to a support 154 extending between the coupling 152 and a beam 160. The beam 160 may support at least one tooling configuration 162. In the example shown in FIG. 2, the tooling configuration 162 may be a dual-plane tool having a pair of weight planes. In the example shown in FIG. 3, the tooling configuration 162 may be a single-plane tool having a single weight plane.

Each of these tooling examples may be used with a specific tire configuration. For example, one tire configuration may require the use of the dual-plane tool, while another may require the use of a single-plane tool. While these two examples are illustrations, multiple other examples may be appreciated including various sizes and spacings of the planes, various other curvatures, shapes, etc. In some examples the system may have various applications and the tool may include gripping fingers, cleaning panels, wipers, and other tools, etc.

Returning to FIG. 1, the nest 150 may store or hold each of the tools 126 when not in use. The weight apply system in this example uses a robot 106 which is configured to couple the selected tool based on the type of assembly 120 in the station. That is, if the assembly 120 requires the first tool then the first tool 126a will be selected or if the second tool is needed, the second tool 126b is selected. Upon selecting the tool, the weight apply robot 106 will move to load the weight onto the selected tool 126 and will apply it to the assembly 120. If the assembly 120 in the station does not require a different tool 126, then a weight apply operation will be performed without changing tools. A nest 150 is used to hold one or more tools 126 based on the assembly 120 variation. This provides the maximum amount of flexibility for the station or cell 100 while making interchangeability possible, efficient, and easy.

Figure 4:
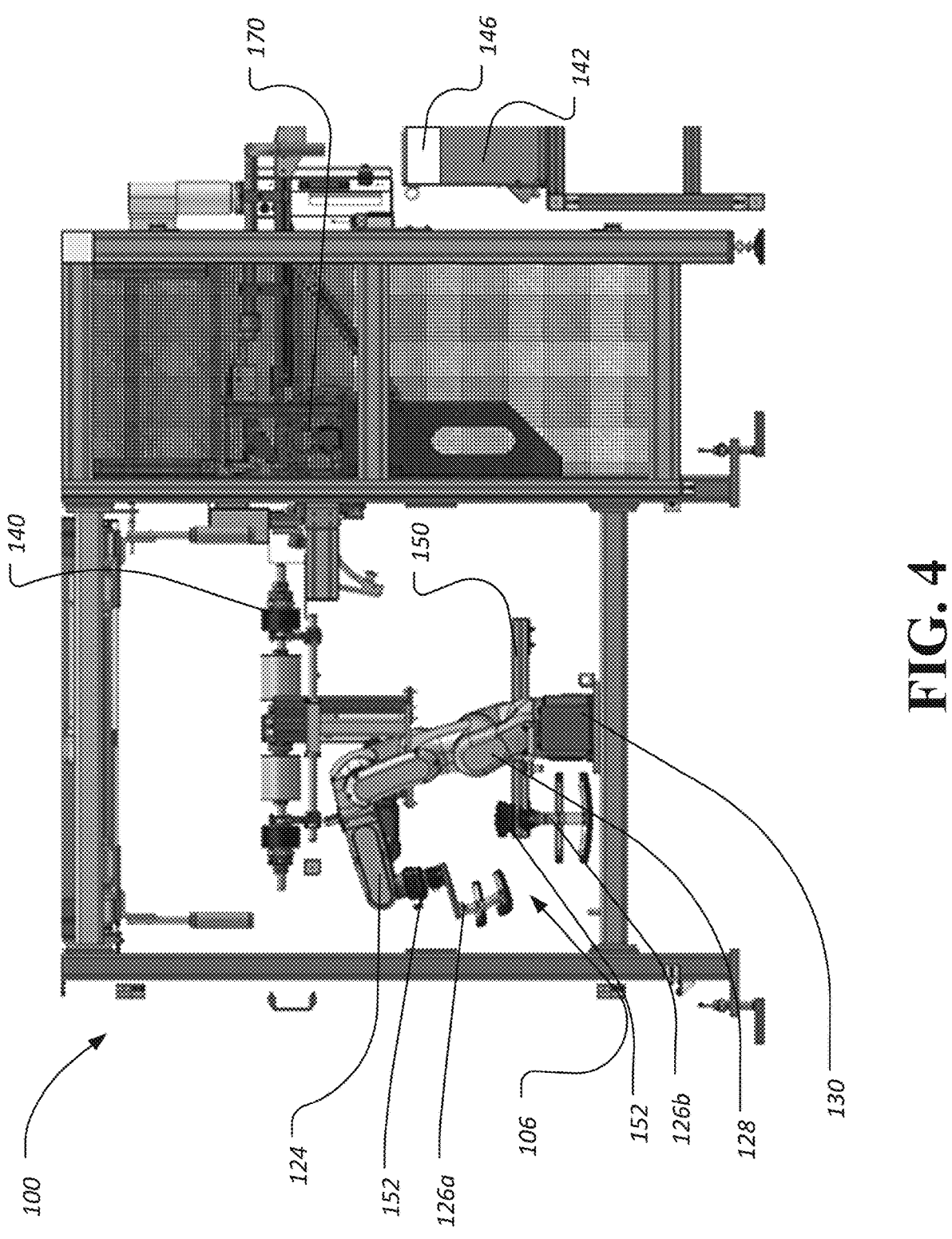
FIG. 4 illustrates an opposite side view of the robotic weight apply system of FIG. 1 without a tire assembly.

FIG. 4 illustrates a side view of the robotic weight apply system of FIG. 1 without a tire assembly 120 and with an engaged tool 126. As illustrate, a first tool 126a may be coupled to the weight apply 106 while a second tool 126b may be stored in the nest 150. By storing the 'extra' tools within the nest 150, the weight apply 106 may easily interchange the tools 126 without the need of manual intervention.

Returning again to FIG. 1, a conveyor 140 may present the tire 120 to the cell 100. The conveyor may also be configured to remove the tire 120 from the cell 100. The conveyor 140 may maintain the tire 120 in a fixed position above the weight apply 106 and may include a pair of tracks or bands configured to move the tire 120 into the cell 100. The weight apply 106 may thus approach the tire from the underside for weight placement, in one example. In another example, a balancer spindle may be included in the cell 100 to maintain the tire thereon.

A weight dispenser 170 may be included in the cell 100 and may be configured to provide weights to the weight apply 106. The weight dispenser 170 may selectively dispense weights, which may be segmented weight material having adhesive backing. The weights may e a strip of weights loaded onto a spool that is mounted within the cell 100. Once the appropriate tool 126 is coupled to the arm 124, the arm 124 may move towards the weight dispenser 170 to receive the weights prior to applying the weights via the tool 126 to the inside of the tire 120.

Although not shown, other components, such as markers, calibration stations, spindles, cameras, etc., may be included in the system 100 to aid in the tire balancing process.

The examples herein show how end-of-arm tools 126 are changed in a robot weight apply system 100 for adapting to multiple assemblies 120. However, it is appreciated that other tools 126 may be interchangeably used. This includes features to accommodate griping or cleaning. The weight apply may be operated by a controller 142 configured to provide instructions for the weight apply 106. Upon completion of the apply the weights, the robot 106 may return to the nest 150 and decouple the tool 126 to restore the tool 126 in the nest during non-use.

The robot 106 may be controlled separate from the system. The controller 142 may be in communication with a system controller configured to manage the entire tire assembly system. The controllers may be controlled remotely, and the controller(s) may be remote from the system 100. The controllers may control the components via wired or wireless communication, by receiving various signals from the components of the system 100, as well as commands from a user via a user interface, etc.

Reference to the "controller" herein may refer to the controller 142, as well as a remote controller may include one or more processors configured to perform instructions, commands and other routines in support of the processes described herein. For instance, the controller may be configured to execute instructions for operation of the weight apply 106, conveyor 140, weight dispenser 170, etc. A computer-readable medium (also referred to as a processor-readable medium or storage) may be included and include any non-transitory medium (e.g., a tangible medium) that participates in providing instructions or other data that may be read by the processor of the controller. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The controller 142 may be configured to receive a force signal from a force sensor, the force signal indication the force at which the weight is being applied. These sensors may supply important feedback to the controller 142 so that the controller 142 may determine whether the method and process was successfully completed. That is, the controller 142 may determine whether the process complied with manufacturer requirements.

The controller 142 may be coupled to a memory 146. The memory 146 may be configured to maintained look-up tables, tire specific specifications, etc. The memory 146 may be configured to maintain an inventory of the tools 126, and associate the tools 126 with the various tire assembly data. For example, a certain tire type may be associated with a specific tool 126. Additionally or alternatively, the tire dimensions, balancing information, etc., may also determine an ideal tool 126 to be associated with the tire. The memory 146 may be local memory or remote or cloud-based. The memory 146 may be continually updated by a user, third party, server, etc., to continually receive updated information regarding the tools 126, tire data, manufacturer requirements, etc.

Figure 5:
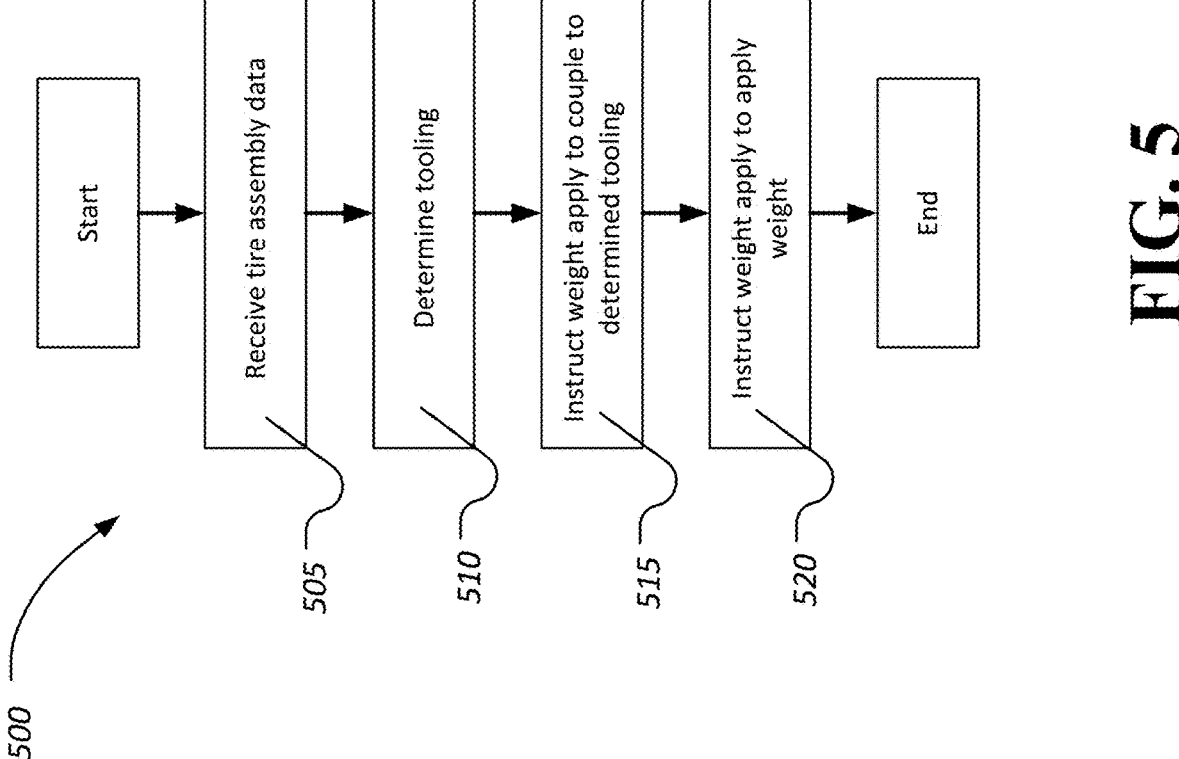
FIG. 5 illustrates an example process for the system of FIG. 1.

FIG. 5 illustrates an example process for the system of FIG. 1. The process 500 may begin at block 505 where the controller 142 may receive tire assembly data. The tire assembly data may include data relating to the tire type, including dimensions, balancing information, etc. This data may be received by imaging a marker on the tire that indicates the tire type, or by user input.

At block 510, the controller 142 may determine, based on the tire assembly data, the necessary tooling for the weight application. For example, the controller 142 may determine whether the first tool 126a or the second tool 126b are necessary for the weight apply process. This may be determined based on a look up table of the tire type, tire assembly or wheel size, etc. The controller 142 may determine whether the tool currently coupled to the weight apply 106 is the needed tool 126. In this case, the weight apply or robot 106 may proceed to operate as needed without the need for a tool change. If the controller 142 determines that a different tool 126 is required, the process 500 proceeds to block 515.

At block 515, the controller 142 may instruct the weight apply 106 to attach the correct tool 126. For example, the weight apply 106 may be instructed to move to the appropriate tool 126 in the nest 150 and couple with that tool 126. In some examples, this may include detaching or decoupling from the current tool and placing the current tool back in the nest 150.

At block 520, the controller 142 may instruct the weight apply 106 to apply the weights to the tire 120. The process 500 may then end.

While the robot 106 is referred to as a weight apply 106 herein, the application is not limited to a weight apply. Many other end-of-arm tools may take advantage of this system. For example, the tool 126 may include gripping fingers, cleaning panels, wipers, and other tools, etc. The applying of the tool may include at least one of wiping the assembly, greasing the assembly, cleaning the assembly, as well as applying weights to the assembly.

The embodiments of the present disclosure generally provide for a plurality of circuits, electrical devices, and at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any controller as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A robotic weight apply system of a tire & wheel assembly system configured to apply weights to a tire assembly, comprising:
   a selectively movable arm;
   a plurality of weight apply tools and
   at least one nest configured to maintain the plurality of weight apply tools during non-use;
      a controller configured to:
         select the at least one weight apply tool from the plurality of weight apply tools based on the tire assembly and instruct the arm to couple with the tool; and
         instruct the arm to move the nest to couple with the selected one of the plurality of weight apply tools arranged in the nest.

2. The system of claim 1, wherein each of the plurality of tools have a distinct tool configurations associated with distinct tire assembly types.

3. The system of claim 2, wherein the tire assembly types includes at least one of a tire assembly size and manufacture.

4. A method for a system to select a tool for weight apply, comprising:
   receiving tire assembly data identifying the tire assembly;
   selecting a tool needed to apply weight to the tire assembly;
   instructing a mechanical system to couple to the determined tool arranged within a cell of the mechanical system; and
   controlling the system to apply the determined tool to the assembly;
   wherein the applying the selected tool includes at least one of wiping the assembly, greasing the assembly, cleaning the assembly, and applying the weights to the assembly.

5. The method of claim 4, further comprising, instruct the mechanical system to move to the determined tool within the cell prior to coupling to the determined tool.

6. The method of claim 4, further comprising, instruct the mechanical system to move to a nest and decouple from the determined tool to store the tool in the nest during non-use of the determined tool after applying the weights to the assembly.

7. The method of claim 4, wherein the tire assembly data includes at least one of a wheel size and manufacture, and wherein the needed tool is determined based on at least one of the wheel size and manufacturer.

8. The method of claim 7, further comprising, in response to a change in tire assembly data from a first type to a second type, instructing the mechanical system to decouple from a first tool and to couple to a second tool.

9. A mechanical system designed to apply weight to an assembly, comprising:
   a controller configured to provide instructions to a weight apply mechanical system, including:
      receiving assembly data indicating at least one tire assembly type;
      selecting one of a plurality of end-of-arm tools based on the tire assembly type;
      instructing a mechanical system to move to the nest to couple to the selected end-of-arm tool; and
      instructing the mechanical system to apply weights via the end-of-arm tool to the assembly.

10. The system of claim 9, wherein the instructions include instructing the mechanical system to return the selected end-of-arm tool to the nest to store the selected end-of arm tool prior to coupling to another end-of-arm tool based on a subsequent tire-assembly type.

11. The system of claim 9, wherein the end-of-arm tool includes a plurality of tools, each with distinct tool configurations associated with distinct assembly types.

12. The system of claim 9, wherein the assembly types includes at least one of a tire size assembly and manufacture.

* * * * *